Sept. 9, 1930.  T. O. SCHRADER  1,775,574
REVERSIBLE STOP FASTENER
Original Filed July 11, 1927
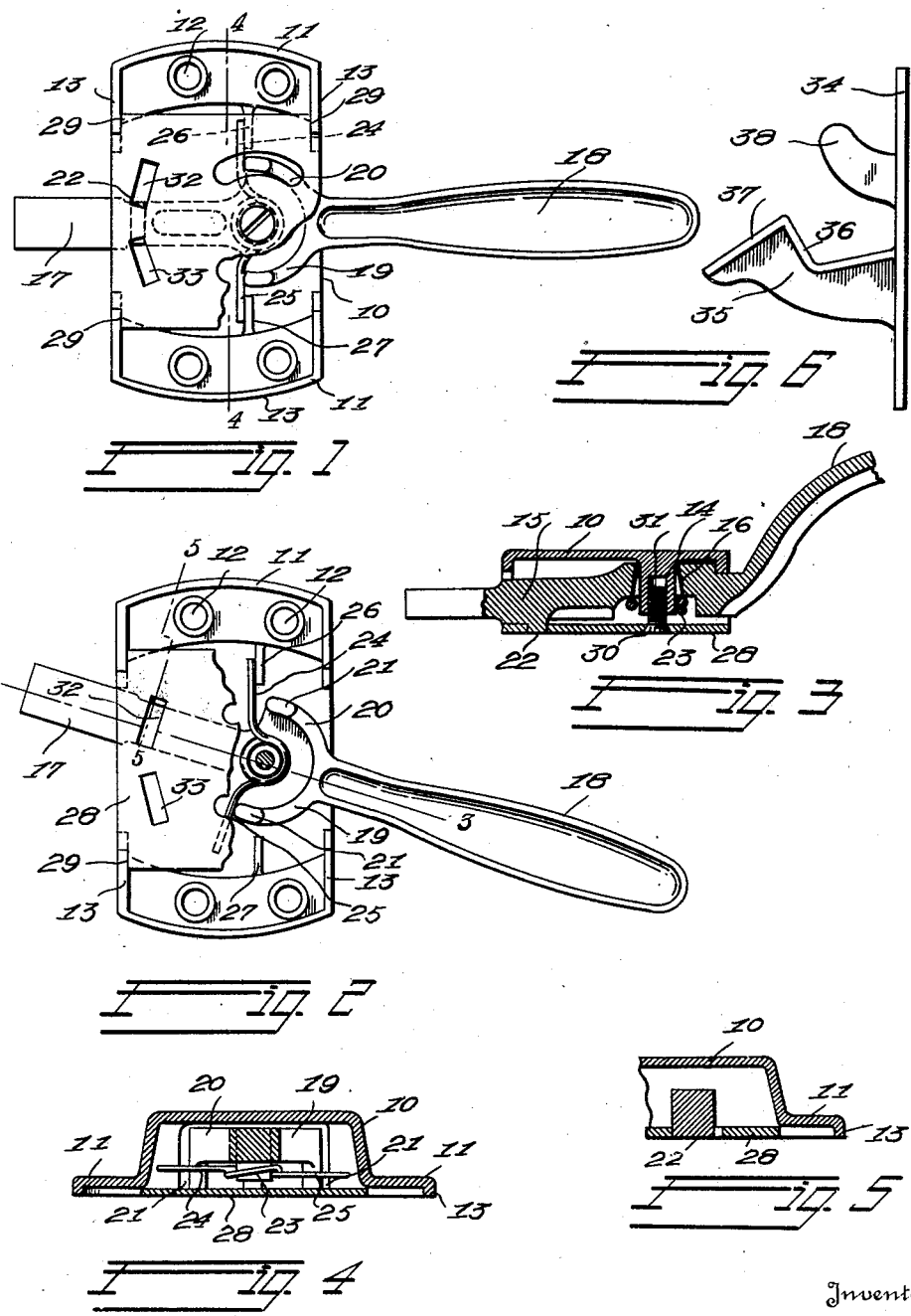
Inventor
Thomas O. Schrader
By Strauch & Hoffman
Attorney Patented Sept. 9, 1930

1,775,574

UNITED STATES PATENT OFFICE

THOMAS O. SCHRADER, OF ALLENTOWN, PENNSYLVANIA, ASSIGNOR TO THE DENT HARDWARE COMPANY, OF FULLERTON, PENNSYLVANIA, A CORPORATION OF PENNSYLVANIA

REVERSIBLE STOP FASTENER

Original application filed July 11, 1927, Serial No. 204,832. Divided and this application filed January 4, 1929. Serial No. 330,323.

This invention relates to a reversible closure fastener of the type that is especially designed for use on hinged refrigerator doors or similar closures.

More particularly, this invention relates to a fastener that includes a bolt so mounted that it may be moved in either direction from a central or operative position so that the fastener may be applied to a door, that is hinged at its left side, or to a door that is hinged at its right side, without any change whatever being required in the fastener in order to adapt it to a door of the type to which it is to be applied.

It has heretofore been proposed to provide such fasteners with a plurality of stops, each serving to maintain the bolt in one of its inoperative positions. By this invention an improved fastener of this kind is presented in which an improved stop arrangement of extreme simplicity in construction, and that may be operated with certainty is provided.

A primary object of the invention is to provide a fastener of the type just described, in which the bolt swings about a fixed pivot so that each part thereof moves in a substantially arcuate path and in which depressions are provided in the bolt casing to receive projections from the bolt, which depresions are located concentrically with respect to the invariable bolt pivot so that they will receive the projection of the bolt with certainty when the bolt is moved to either of its inoperative positions.

A further object of the invention is to provide a reversible fastener of the stop type, that is inexpensive to construct and embodies few simple parts that are so formed and assembled that a fastener having a long life is provided.

Further objects of the invention will appear as a description thereof proceeds with reference to the accompanying drawings, in which:

Fig. 1 is a rear view of the improved fastener, a portion of the cover plate being broken away to show the interior construction.

Fig. 2 is a view similar to Fig. 1 but showing the bolt in one of its inoperative positions.

Fig. 3 is a sectional view taken on the plane indicated by the line 3—3 of Fig. 2.

Fig. 4 is a sectional view on the plane indicated by the line 4—4 on Fig. 1.

Fig. 5 is a fragmentary sectional view taken on the plane indicated by the line 5—5 on Fig. 2.

Fig. 6 is a side elevation of a keeper for use in connection with the novel fastener of this invention.

Like reference characters indicate like parts throughout the several views.

In the drawings, the numeral 10 indicates a housing for the fastener. Said housing is provided with lateral projections 11 that are perforated as shown at 12 in order that fasteners may be applied to secure the housing to the closure or door. The edges of the lateral projections 11 are turned inwardly to provide flanges, as shown at 13, to space the housing and said projections from the face of the closure to which the fastener is applied, and so as to space the housing from the face of the closure in order that a cover plate, presently to be described, may be attached to the rear of the housing while permitting the flanges 13 to contact with the face of the closure at all points around the periphery thereof.

The housing 10 is preferably provided for an inwardly projecting post 14 (Fig. 3) that serves as a pivot for a bolt 13 that is provided with a tapered opening 16 designed to receive said post when the bolt is assembled in the housing. The smaller dimension of the tapered opening 16 corresponds approximately to the diameter of the post 14 so that the bolt is guided in a substantially arcuate path with respect to said post as an axis. The opening 16 is tapered so that the bolt may be tilted toward and from the top of the housing 10 and toward and from a cover plate previously referred to. It will be observed that in view of the fact that the smaller dimension of the tapered opening 16 corresponds approximately with the diameter of the post 14 that such lateral tilting of the bolt 15 can take place while the bolt is moving in a definite arcuate path.

The bolt 15 is provided with an end 17 projecting from the housing and designed to engage a keeper to be later described. The bolt 15 is also provided with a handle 18, of any suitable form, and by which the bolt is manipulated. Adjacent the opening 16 in the bolt 15, the bolt is provided with a pair of lateral projections or arms 19 and 20, each of which is provided with a finger 21 extending rearwardly of the front face of the housing 10 when the bolt is assembled in said housing. At a point spaced substantially endwise of the bolt from the opening 16, it is provided with a shouldered lug 22 provided to cooperate with the walls of depressions about to be described, to hold the bolt in either of its inoperative positions.

A coil spring 23 is coiled around the post 14 between its ends and the ends 24 and 25 thereof extend radially from the post 14 and in substantial alinement, so that said ends bear against the fingers 20 and 21 respectively, carried by the bolt 15. The housing 10 is provided with inwardly extending projections 26 and 27, against which the ends 24 and 25 of the spring 23 rest when the bolt is in its operative position, as shown in Fig. 1. The coil spring 23 is so arranged that the arms 24 and 25 thereof engage the stops 26 and 27 firmly under tension, when the bolt is in its operative position so that said spring tends to hold the bolt in its inoperative position.

A cover plate 28, provided with recesses 29 to permit the cover plate to fit around the edges of the flanges 13 of the lateral extensions 11 of the bolt housing, in order that said cover plate may be non-rotatively positioned with respect to said housing, closes the rear of said housing. Said cover plate is secured to the housing, preferably, by a screw 30 engaging a threaded bore 31 in the post 14. The cover plate is provided with a plurality of depressions preferably formed by stamping slots 32 and 33 in said cover plate. Said slots are arranged with their centers on the arc of a circle drawn from the center of the post 14 about which the bolt 15 moves in order that they will be in position to receive the lug 22 of the bolt 15 when it is moved to either of its extreme positions.

For cooperation with the fastener just described, a keeper of the type illustrated in Fig. 6 is preferably employed. Said keeper includes an attaching portion 34 and an outwardly extending portion 35 formed to provide a shoulder 36 with which the end 17 of the bolt 15 engages when said bolt is in its operative position. The projection 35 is provided with an inclined bolt guiding surface 37 provided to retract the bolt when the door is closed if, for any reason, it is not held in its retracted position by the stops. Above the projection 35 the keeper 34 is provided with a trip finger 38 for a purpose presently to be described.

In the operation of the fastener of this invention, when the bolt 15 is in its operative position shown in Fig. 1 of the drawings, it is in engagement with the shoulder 36 of the keeper which keeper is attached to the frame of the door adjacent the door in well known manner. When it is desired to open the door the handle 18 is grasped and the bolt is swung on the pivot at the same time. At the same time that the bolt is swung on its pivot a pull is exerted on the handle to swing the door on its hinges. Such pull assists to tilt the bolt with respect to the post 14, causing the lug 22 to enter one of the depressions or openings 32 or 33 in the cover plate 28 when said lug is brought into registry therewith. Inasmuch as the path of movement of the bolt is definitely predetermined by the fact that it is pivoted on the post 14, the lugs 22 may be readily entered in either of said openings. Furthermore, as said openings may be formed by simply stamping them in the cover plate during the course of its manufacture, it will be understood that the provision of the depressions or openings to receive the lug on the bolt is a matter of extreme simplicity and entails substantially no added cost to the production of the fastener. It will be observed further, that the openings stamped from the cover plate provide square shoulders that, when engaged with similar shoulders provided on the lug 22, serve to firmly hold the bolt in its retracted position. It will be noted that the cover plate is free of projections on its inner surface that might interfere with the free movement of the bolt.

It will be understood that the operation of the fastener is precisely the same when it is applied to a door hinged at its right hand side, as when it is applied to a door hinged at its left hand side, though when the fastener is used on one of the types of hinged doors, just referred to, the lug 22 on the bolt engages the opening 32 in its retracted position and when it is used on the other type of door said lug engages the opening 33 of the cover plate.

This application is a division of my copending application, Ser. No. 204,832, filed July 11, 1927.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A reversible closure fastener for a hinged closure comprising a fastener housing, a bolt pivoted in said housing for substantially equal angular movement above and below a horizontal or operative position, said bolt being free to tilt laterally with respect to its pivotal mounting but being incapable of substantial bodily movement with respect to said mounting, spring means to return said bolt from either of its angular positions to its horizontal position, a lug on said bolt and a plurality of depressions located in a wall of said housing and arranged concentrically with respect to the axis about which the bolt pivots to receive and retain the bolt in either of its angular positions until the bolt is caused to tilt with respect to its pivot.

2. A reversible closure fastener for a hinged closure comprising a fastener housing open at the rear thereof, a bolt pivoted in said housing for substantially equal angular movement above and below a horizontal or operative position, said bolt being free to tilt laterally with respect to its pivotal mounting but being incapable of substantial bodily movement with respect to said mounting, spring means to return said bolt from either of its angular positions to its horizontal position, a lug on said bolt, a cover plate closing the rear of said housing, said cover plate being free of projections adjacent the path of movement of said bolt but provided with a plurality of depressions arranged concentrically with respect to the axis about which the bolt swings and designed to receive said lug when the bolt is moved to either of its angular positions, in order to retain said bolt in one of said positions until it is caused to tilt with respect to its pivotal mounting to release said lug from one of said depressions.

3. A reversible closure fastener for a hinged closure comprising a fastener housing open at the rear thereof, a bolt pivoted in said housing for substantially equal angular movement above and below a horizontal or operative position, said bolt being free to tilt laterally with respect to its pivotal mounting but being incapable of substantial bodily movement with respect to said mounting, spring means to return said bolt from either of its angular positions to its horizontal position, a lug on said bolt, a cover plate of sheet metal closing the rear of said housing and provided with a plurality of openings stamped from said cover plate and arranged concentrically with respect to the axis of the bolt pivot, and designed to receive said lug when the bolt is moved to either of its angular positions, said plate being free of projections extending adjacent the path of movement of said bolt.

THOMAS O. SCHRADER.